United States Patent

Meijer

[15] 3,638,488
[45] Feb. 1, 1972

[54] FLUID VELOCITY MEASURING DEVICE AND METHOD

[72] Inventor: Robert S. Meijer, Chicago, Ill.
[73] Assignee: Alnor Instrument Company, Div. of Illinois Testing Laboratories, Chicago, Ill.
[22] Filed: Aug. 17, 1970
[21] Appl. No.: 64,312

[52] U.S. Cl. ............................................73/194 B, 73/204
[51] Int. Cl. ..........................................................G01f 1/00
[58] Field of Search ........................73/194 B, 204, 228, 181

[56] References Cited

UNITED STATES PATENTS

| | | | |
|---|---|---|---|
| 2,524,747 | 10/1950 | Ayres et al. | 73/182 X |
| 2,779,193 | 1/1957 | Lee | 73/194 B UX |
| 3,076,334 | 2/1963 | Wiley | 73/204 X |
| 3,332,282 | 7/1967 | Daw | 73/180 X |
| 3,333,468 | 8/1967 | Jacobs | 73/212 UX |
| 3,426,593 | 2/1969 | Jacobs | 73/194 B |

*Primary Examiner*—Charles A. Ruehl
*Attorney*—Silverman & Cass

[57] ABSTRACT

For the measurement of low-fluid velocities, especially velocities which are very low, a probe is oscillated in the stream of fluid in a simple harmonic motion and in a plane that is parallel to the fluid flow. The probe carries a transducer of a type whose output is some function of relative air flow over the transducer. The frequency or amplitude of the oscillation is chosen so that at some point in the cyclic movement, the velocity of the transducer relative to the fluid stream will be zero. The output of the transducer is compared with the mechanical oscillation of the probe to find the angular positions of the probe at which there is zero relative speed and these positions are related to fluid velocity in accordance with the expression $$V_f = A\omega \cos \theta,$$

where $V_f$ is the velocity of the fluid medium, $A$ is the amplitude of the vibration of the probe, $\omega$ is the angular frequency of the vibration and $\theta$ is the angular position of the probe when velocity of transducer relative to the fluid medium is zero.

8 Claims, 4 Drawing Figures

PATENTED FEB 1 1972

Inventor
ROBERT S. MEIJER
BY
Silverman + Cass
ATTYS.

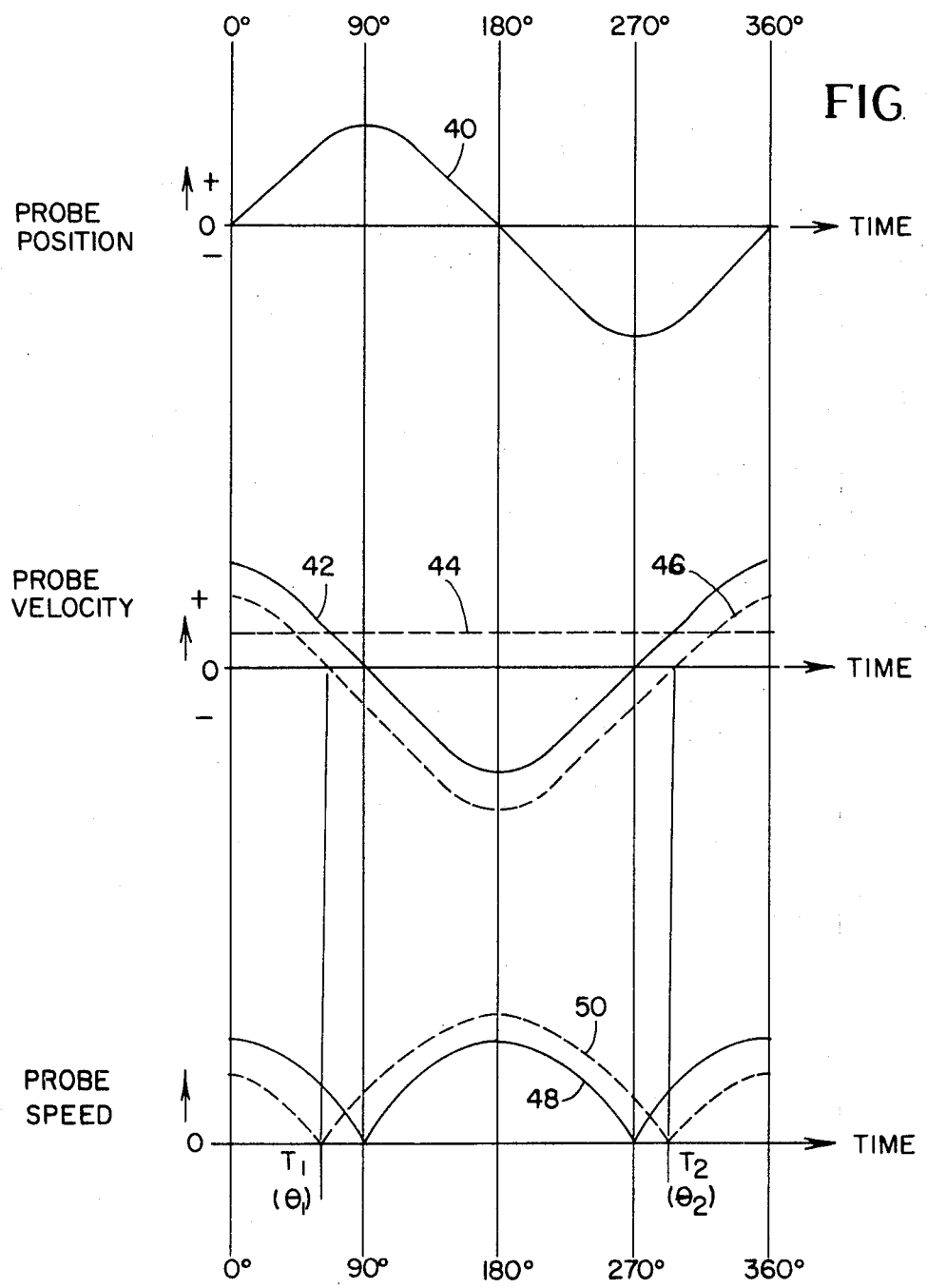

FLUID VELOCITY MEASURING DEVICE AND METHOD

BACKGROUND OF THE INVENTION

The invention herein relates to a method and means for measuring the velocity of flowing fluids, such as air or liquids. Specifically, the invention is concerned with the measurement of very low velocities, say, in the case of air—of the order of several feet per minute.

Such devices as heretofore used have been generally of two types, one of which utilizes the loss of heat to a fluid which passes the same, the loss of heat being a function of the velocity of the fluid as expressed by the equation:

(1) $T=k/V^c$, where $T$ is the temperature of the heated element, $V$ is the velocity of the fluid medium at that temperature and $k$ and $c$ are constants depending upon the medium, the temperature measuring device, and the heat transfer from the heated element in the fluid medium to the temperature measuring device. Such a device is disclosed in U.S. Pat. No. 2,849,880.

The second type of device depends upon the movement of a vane produced by the impact pressure of flowing medium, such movement being generally opposed by a spring or a twisting fiber. An example of such a device is disclosed in U.S. Pat. No. 3,463,003.

The first of the above devices uses a lost heat device, that is, a device which loses heat to the flowing medium at a rate which depends upon several parameters. These parameters include the temperature of the medium, the composition of the medium if it is a gas mixture, the thermal conductivity of the medium, and the barometric pressure in the case of air or other gases.

In the case of known lost heat devices, these being known generally as thermal anemometers, the lower limit of gas velocity which such device is capable of measuring with any reasonably accurate degree is about 10 feet per minute. In the case of vane devices, the lower limit of gas velocity which can be accurately measured is of the order of 25 feet per minute.

So far as is known, thus far there has been no device capable of measuring a flow of several feet per minute with any reasonable accuracy. The invention teaches a method and means for making such measurements from first principles.

SUMMARY OF THE INVENTION

According to the invention, a probe is disposed in a flowing fluid medium, the probe having a transducer at its end which will respond in some manner to the flow of the medium. This can be a lost heat device, a vane attached to a strain gauge or the like. The flow responsive device may be electrical, mechanical or fluidic in nature. The probe is oscillated in a substantially simple harmonic motion, describing a path which is substantially parallel with the flow of the medium, so that for one-half of its oscillating cycle it is moving in the same direction as the medium, and for the other half of its cycle, it is moving in the opposite direction. The frequency of oscillation is chosen so that at some point in its oscillation, it will pass through the velocity of the medium, that is, it will have a zero relative velocity.

The transducer carried on the probe will respond in accordance with the cyclic function that follows from the relative velocity of the probe to the medium. When the medium is not flowing at all, the cyclic function will resemble a sine wave, that is, it will indicate maximum relative flow passing through the center position, and zero at the ends of each half wave. Thus, if we consider a lost heat device such as a thermistor which has a constant current flowing in it mounted on the end of the oscillating probe, at the center of the oscillation the speed of the probe will b maximum and hence the thermistor temperature will be at its lowest with its resistance at its highest. At the ends of the oscillation, when the movement of the probe becomes zero, the thermistor temperature will be its highest because it will not be losing as much heat and its resistance will be the lowest, assuming that the medium is still.

When the medium is moving in one direction, obviously the cyclic function of the thermistor resistance will change, shifting in accordance with the velocity of the medium. As will be shown hereafter, the velocity of the medium, which is the desideratum, is proportional to the cosine of the angular position of the probe when the velocity of the probe relative to the velocity of the medium is equal to zero.

Assuming that the probe is oscillating in a pure simple harmonic motion, the position $X$ of the probe at any time is defined by the expression:

(2) $X = A \sin \omega t$, where ti $X=0$ at the neutral (center) position, $A$ is the probe amplitude, angular angular frequency of oscillation in radians per unit of time $t$. The instantaneous velocity of the probe as a function of time is the first derivative with respect to time of the expression (2), or:

(3) $V = dx/dt = A\omega \cos \omega t$, the relative velocity $Vr$ of the probe when compared to the moving medium is the difference between the instantaneous velocity of the probe $V$ and the velocity of the medium $Va$, or:

(4) $Vr = A\omega \cos \omega t - Va$, when the relative velocity $Vr=0$, then $A\omega \cos \omega t - Va = 0$, then it follows that:

(5) $Va = A\omega \cos \omega t$, at that moment and if $\omega t = \theta$ then the probe position $\theta$ at which maximum self-heating or minimum voltage occurs in a thermistor transducer, is when the relative velocity $Vr$ is 0, then:

(6) $Va = A\omega \cos \theta$, or, the velocity of the medium such as air in the example to be described, is equal to the amplitude of the probe, multiplied by the angular frequency and the cosine of the angular position of the probe at which the relative velocity is zero.

According to the above, a device is constructed to provide information of the point in the excursion of the probe at which the velocity of the probe relative to the medium is zero, and this is a measure of the velocity of the medium. In the example described, a phase comparison device in the form of a cathode ray oscilloscope is used to give a display of the angular position of the probe when this occurs, and this information is readily converted into velocity of the medium.

BRIEF DESCRIPTION OF THE DRAWINGS

FIG. 4 is a chart showing graphs of heat loss versus probe position for various velocities of the air.

FIGS. 4a, b, and c are charts showing probe position, velocity and speed, respectively.

DESCRIPTION OF THE PREFERRED EMBODIMENT

Figure 1:
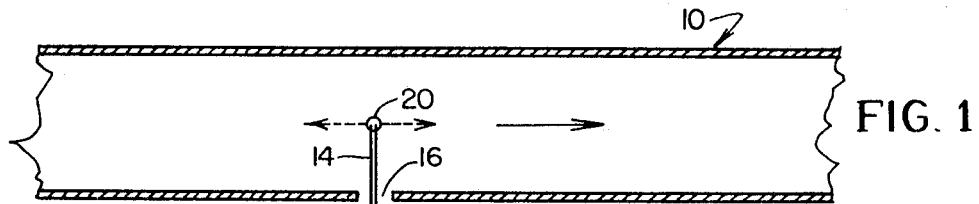
FIG. 1 is a diagrammatic view of a structure used to measure the velocity of air passing through a plenum.

In FIG. 1 there is illustrated a plenum 10 which has air flowing in it at a constant velocity in one direction. The apparatus 12 is used to measure the velocity of the air $Va$. There is a probe 14 which may be a simple wand or rod that has sufficient resilience to vibrate continuously. The probe 14 extends through an opening 16 in the wall of the plenum 10 into the air stream. It is secured to a fixed mounting 18 and has a thermistor or other lost head device 20 mounted on the end in the air stream. The thermistor 20 has leads 22 connecting same to the probe output amplifier circuit 24, the leads extending through the probe or on its surface so as not to interfere with the mechanical movement of the probe 14.

The probe 14 is oscillated in a plane parallel to the flow of air by an electromagnetic driver 26 that is energized by any suitable low-frequency oscillator 28. The frequency typically may be of the order of 7 to 10 cycles per second. The driver typically has a coil 30 in series with a diode 32 so that the oscillations are converted into pulsed DC in the coil. The lost heat device 20 is driven by substantially constant current, as, for example, using a very high-resistance element 34 in series with it, energized by a DC source 36.

Inviting attention to FIG. 4, there is shown three graphs of probe position, velocity and speed versus angular position of the probe. The horizontal axis is shown laid out in degrees from 0° to 360°. 0° is assumed to be in the exact center of the harmonic movement of the probe, 90° at one end of the movement, 180° again at the center of movement, 270° at the opposite end of movement and 360° once more in the center. The sequence of time in the chart is left to right. From 0° to 90° the probe 14 is taken as moving in the same direction as the flow so that the movement from 90° to 270° is opposite the direction of flow, and movement from 270° to 360° is again in the same direction as flow. With a constant current energizing the thermistor, any air movement relative to the thermistor causes a loss of heat and this changes the resistance. When the temperature of the thermistor decreases, its resistance and hence its voltage output increases. The velocity of the probe is related to the voltage output of the thermistor on the probe in accordance with the heat loss versus output voltage characteristic, which while it is not linear is nonetheless monotonic.

The velocity of the probe is known at all times as a function of position if the motion is simple harmonic. If the position of the probe can be detected at the instant that the velocity of the moving fluid medium, such as air, is equal to the velocity of the probe then the velocity of the air can be determined because it is simply the velocity of the probe at that moment in time. The relative velocity of the probe at that instant is zero, and its heat loss is minimum while its voltage is also at a minimum.

In FIG. 4a, there is shown a curve 40 which represents the simple harmonic movement of the probe in equal amounts on opposite side of center. Depicted in this view is the probe position in space. It will be seen that its maximum excursion occurs at 90° and 270° but on opposite sides of the center.

FIG. 4b depicts three characteristics, all of which are related to velocity, and hence have direction. The velocity of the probe is represented by the curve 42 and it will be seen that it is 90° out of phase with the probe position. The maximum velocity occurs in the center of the oscillation, that is at 0° and at 180° but moving in opposite directions. The broken line 44 represents the constant velocity of the medium in one direction only. Then the broken line graph 46 is the sum of two velocities, that is, the velocity 44 of the air and the absolute velocity of the probe, subtracted with regard to sign. This results in a velocity 46 of probe relative to the air.

Looking at FIG. 4b, the absolute velocity of the probe and that of the air are equal at times T1 and %2, since the air velocity 44 subtracts above the zero excursion line and adds below, the apparent zero velocity or relative velocity occurs displaced phase-wise from the zero velocity of the probe when there is no air flow.

In FIG. 4c, the graphs 42 and 46 have been translated into speed, since the lost heat device of the probe is only interested in speed relative to air. The absolute speed is represented by the curve 48, having its nodes or zero points at 90° and 270°, while the speed of the lost heat device relative to the air becomes the curve 50 with the nodes or zero points occurring at T1 and T2. From what has been discussed above, these will also be the minimum voltage points considering the output of the thermistor. Different air velocities will cause other shifts in the phase of the resulting wave 50, with the higher velocities shifting the node points further and further away from the 90° and 270° positions of the probe. The times T1 and T2 are directly related to angular positions $\theta_1$ and $\theta_2$. The velocity of the probe at these points is equal to the velocity of the air.

As explained above, the velocity of the air is proportional to the cosine of the angular position of the probe when the relative velocity of thermistor and air is zero, and this condition occurs at the minimums. Accordingly, an evaluation of the angular position of the minimums can readily be converted into velocity by suitable computation or by charts used in conjunction with a display. As described hereinafter, the display is a cathode ray oscilloscope in which the location of minimums relative to zero air velocity can be seen and measured.

Figure 2:
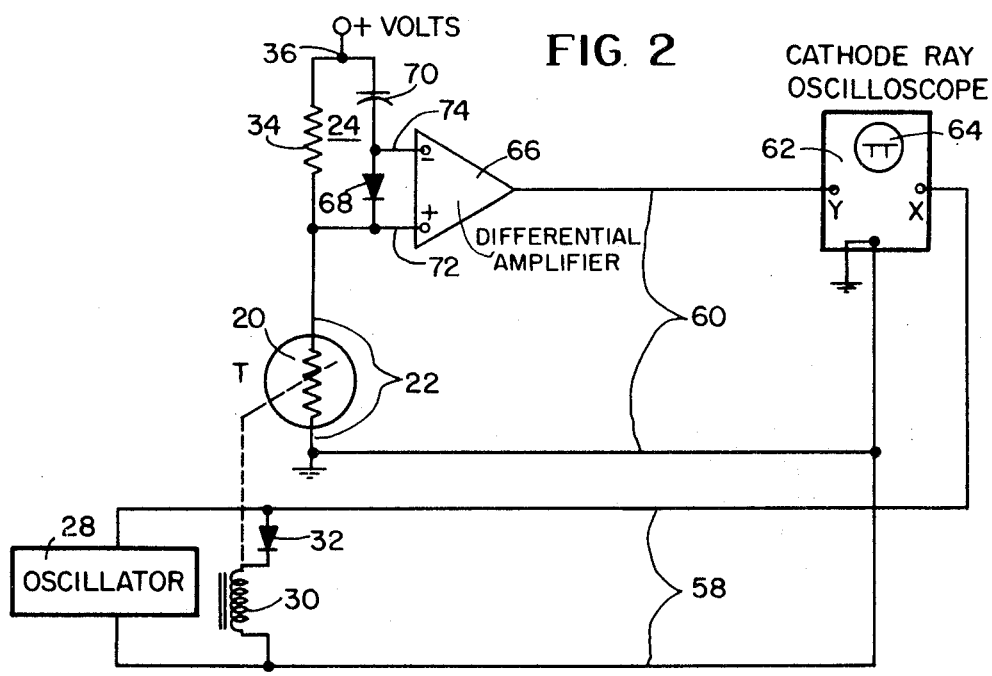
FIG. 2 is a circuit diagram of the same.

In FIG. 1, the phase of the oscillator 28 and the phase of the probe output amplifier 24 are applied by channels 58 and 60 to a phase comparator 62 whose output will provide a value that can be converted readily into velocity of air. The display 64 can be any device which gives a visual response of the comparison. In FIG. 2, the comparison is done by applying the oscillation of the oscillator 28 to the X-axis of the cathode ray oscilloscope 62 and the output from the differential amplifier 66 to the Y-axis Then there will be a display of the phase comparison.

In FIG. 2, as an example of probe output amplifier circuit 24, the leads 22 are additionally connected to the diode 68 and capacitor 70 with the lead 72 from the cathode of the diode 68 connected to the positive terminal of the amplifier 66 and the lead 74 from the anode being connected to the negative terminal of the amplifier.

Figure 3:
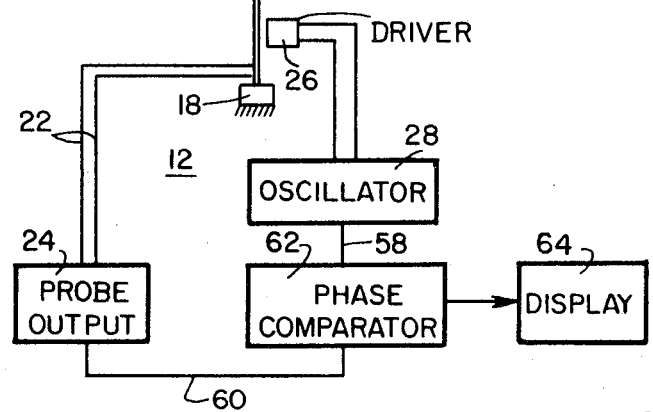
FIG. 3 is a diagram of the face of the cathode-ray oscilloscope of FIG. 2 showing the display thereof.
Figure 3:
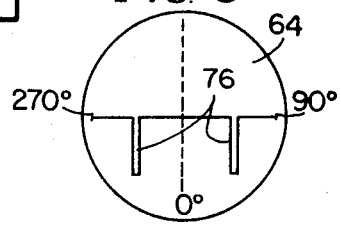

In operation, the capacitor 70 charges up to the peak negative value of the voltage across the thermistor 20 and retains that charge at all times since the diode 68 is poled to prevent discharge. At all times that there is a difference between the voltages applied to the positive and negative terminals of the amplifier 66, due to its high gain it will be saturated and provide no output. The lead 72 varies directly as the signal, and hence when the difference between this signal and the peak negative voltage become practically zero, the amplifier will produce an output. This will be in the form of spikes at the maximum negative voltage of the signal or at the minimum heat loss condition. The spikes are shown at 76 on the display in FIG. 3. In this case, the horizontal axis of the cathode ray tube has the 0° angular position in its center, with the trace folded back on itself, giving a true picture of the probe oscillation and the location of the minimums.

In the case of a transducer which will respond as a relative velocity indicating device, the same analysis may be made. Thus, a sensitive strain gauge connected to a two-way movable vane when mounted on a probe and vibrated in an air stream is susceptible of a similar analysis.

What it is desired to secure by Letters Patent of the United States is:

I claim:

1. The method of measuring the velocity of a fluid of constant velocity flowing in a vessel which comprises
   A. oscillating a flow responsive device in the stream of fluid in a plane parallel with the flow at a simple harmonic rate and with an amplitude and frequency which will render the velocity of the flow responsive device equal to that of the fluid at some point in the cycle of oscillation,
   B. ascertaining the angular position of the flow responsive device when its velocity relative to the stream of fluid is equal to zero,
   C. and relating velocity of the stream of fluid in accordance with the formula
   $V_f = A\omega \cos \theta$,
   where $V_f$ is the velocity of the fluid medium,
   A is the amplitude of the oscillation,
   $\omega$ is the angular frequency of the oscillation and
   $\theta$ is the angular position of the flow responsive device when its velocity relative to the flow medium is zero.

2. The method as claimed in claim 1 in which the angular position of the flow responsive device is obtained by deriving an electrical characteristic of the mechanical oscillation of said flow responsive device, deriving an electrical characteristic of the relative speed of the flow responsive device, and comparing the phase of the two.

3. The method as claimed in claim 2 in which the electrical characteristic of the mechanical oscillation is applied to one axis of a cathode ray tube and the electrical characteristic of relative speed is applied to the other axis of the cathode ray tube whereby to obtain a display of the phase comparison.

4. The method of ascertaining the velocity of a fluid of constant velocity flowing in a vessel comprising;

A. oscillating a flow responsive device in the stream of fluid in a simple harmonic motion in a plane parallel with the flow with an amplitude and frequency which will render the velocity of the flow responsive device equal to that of the fluid at some point of time during which the oscillation is occurring, B. detecting the position of the probe at the instant that the velocity of the fluid is equal to that of the probe at that moment in time, and C. converting probe position into velocity.

5. Apparatus for measuring the velocity of a fluid of constant velocity flowing in a vessel which comprises:

A. a probe having a heat responsive device on one end thereof and the other end being fixed, B. means to oscillate the probe in a plane parallel with the flow at a frequency and amplitude which at some point will cause the velocity of the fluid and that of the probe to be equal, C. first means for converting the velocity of the probe relative to the fluid medium into a repetitive signal that varies with the response of said heat responsive device, D. second means for converting the oscillation of the probe into a repetitive signal that varies with the mechanical oscillation of the probe, E. and means for comparing the signals to obtain a phase comparison between them.

6. The apparatus as claimed in claim 5 in which means are provided for displaying the phase comparison.

7. The apparatus as claimed in claim 5 in which the first means comprises an amplifier circuit producing a signal only when the velocity of the fluid and that of the probe are equal, the relative velocity of the probe being zero.

8. The apparatus as claimed in claim 7 in which the comparison means comprise a cathode ray tube, and the signals from the first and second converting means are applied to one and the other of the X and Y axes of said cathode-ray tube respectively.

* * * * *

PO-1050
(5/69)

UNITED STATES PATENT OFFICE
CERTIFICATE OF CORRECTION

Patent No. 3,638,488     Dated February 1, 1972

Inventor(s) ROBERT S. MEIJER

It is certified that error appears in the above-identified patent and that said Letters Patent are hereby corrected as shown below:

Col. 1, line 69, change "is" to --be--; col. 2, line 12, delete "ti"; col. 2, line 13, change "angular"(first occurrence) to --and is the--; col. 2, line 64, change "head" to --heat--; col. 3, line 49, change "%2" to --T2--;
    col. 5, lines 7,8,10, change "probe" to --flow responsive device--(in all three cases).

Signed and sealed this 3rd day of October 1972.

(SEAL)
Attest:

EDWARD M. FLETCHER, JR.
Attesting Officer

ROBERT GOTTSCHALK
Commissioner of Patents